United States Patent [19]

Briggs

[11] Patent Number: 4,779,887
[45] Date of Patent: Oct. 25, 1988

[54] BOAT TRAILER BOAT HULL GUIDING SYSTEM

[76] Inventor: David S. Briggs, Rte. 8, Box 89, Opelousas, La. 70570

[21] Appl. No.: 134,090

[22] Filed: Dec. 16, 1987

[51] Int. Cl.⁴ .............................................. B60P 3/10
[52] U.S. Cl. ................................. 280/414.1; 414/535
[58] Field of Search .......................... 280/414.1, 414.3; 414/535, 534, 533, 532, 495; 193/35 SS, 35 B, 35 C, 35 R; 114/344

[56] References Cited

U.S. PATENT DOCUMENTS 3,077,277  2/1963  Holzman .............................. 414/534
3,117,683  1/1964  Kleppe ................................. 414/534
3,131,902  5/1964  Zak, Jr. ............................. 280/414.1

Primary Examiner—David M. Mitchell
Assistant Examiner—Donn McGiehan
Attorney, Agent, or Firm—Fleit, Jacobson, Cohn & Price

[57] ABSTRACT

A pair of opposite side guide members are mounted from opposite side rear portions of a trailer frame for guided shifting along upwardly convergent paths and the upper ends of the guide members include upwardly facing hull undersurface engaging and supporting heads oscillatably supported from the guide members for angular displacement relative thereto about axes extending generally longitudinally of the trailer frame. The guide members are yieldingly biased toward upper limit positions and the heads are oscillatable between first upright upwardly facing positions and second inclined limit positions with the heads facing in upwardly convergent directions inclined generally 45° relative to the horizontal. The heads are gravity biased toward the inclined limit positions thereof.

10 Claims, 2 Drawing Sheets

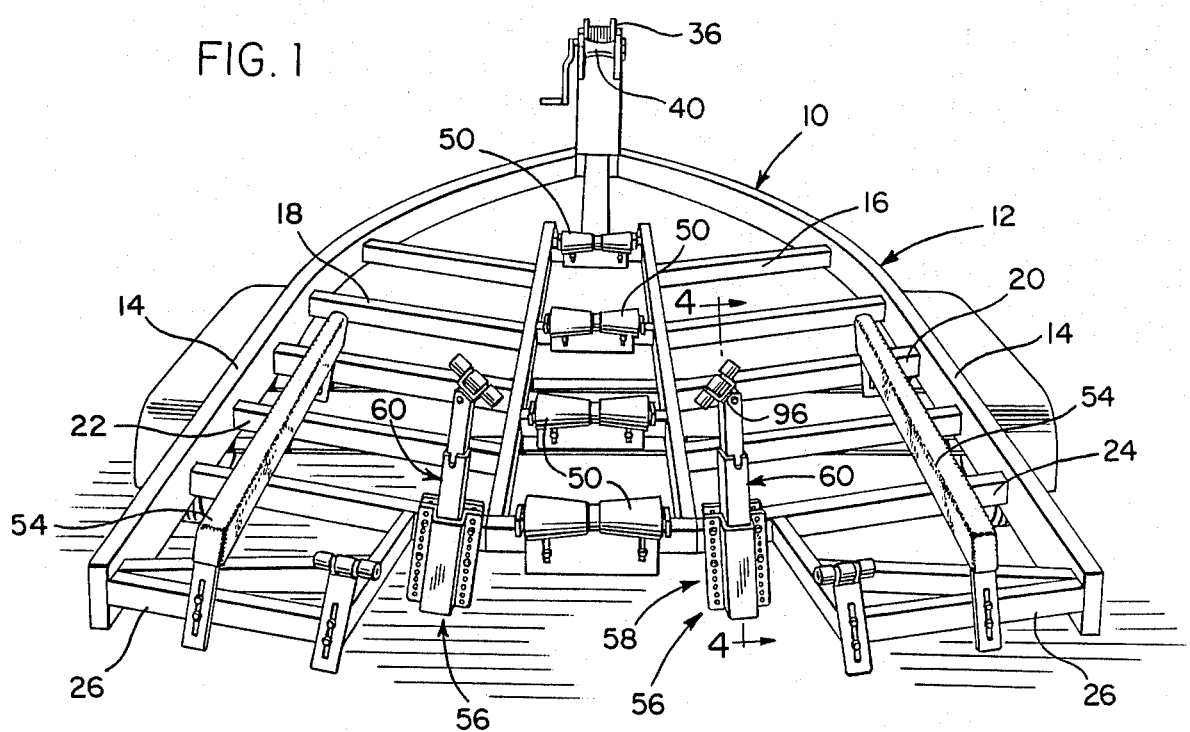
FIG. 1
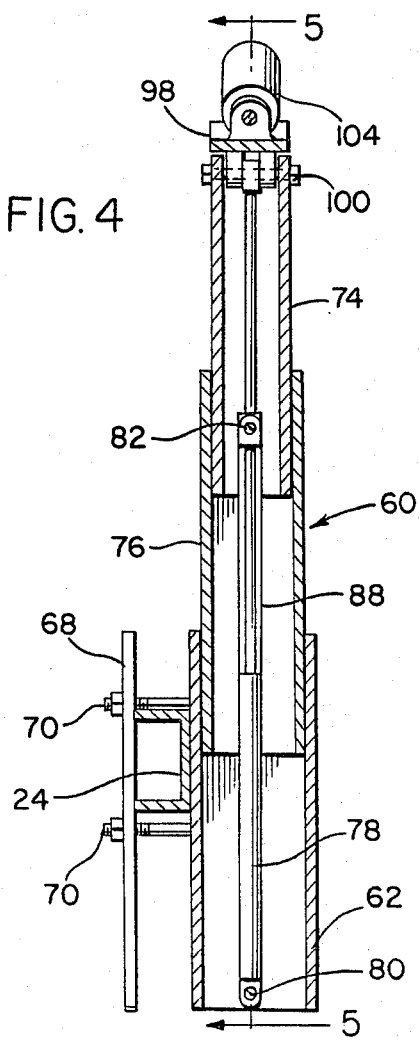
FIG. 4
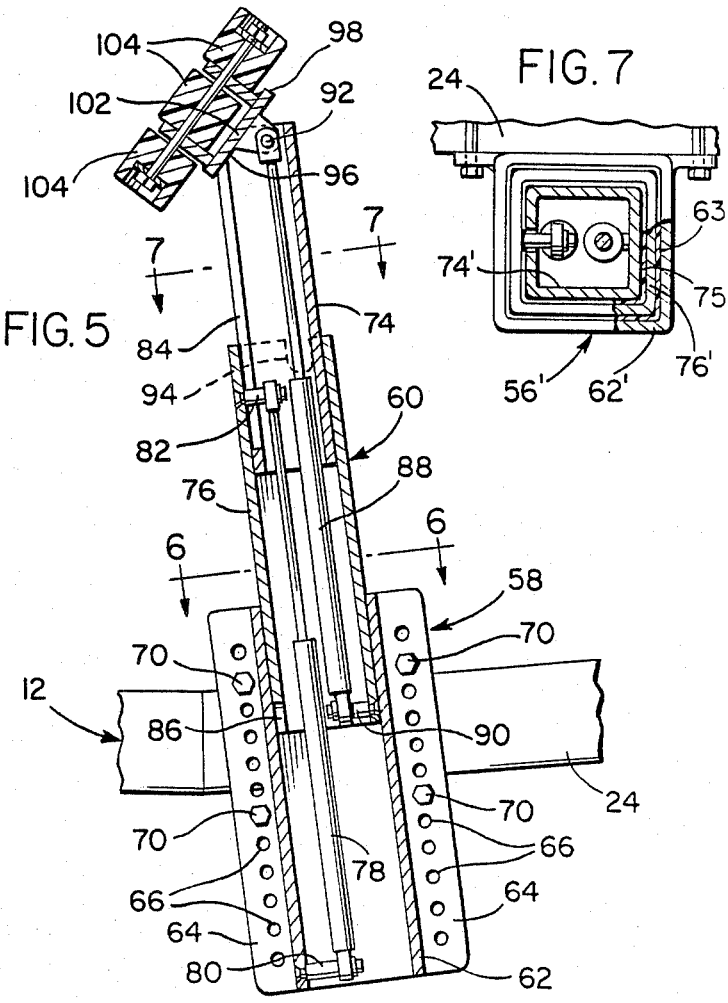
FIG. 5
FIG. 7

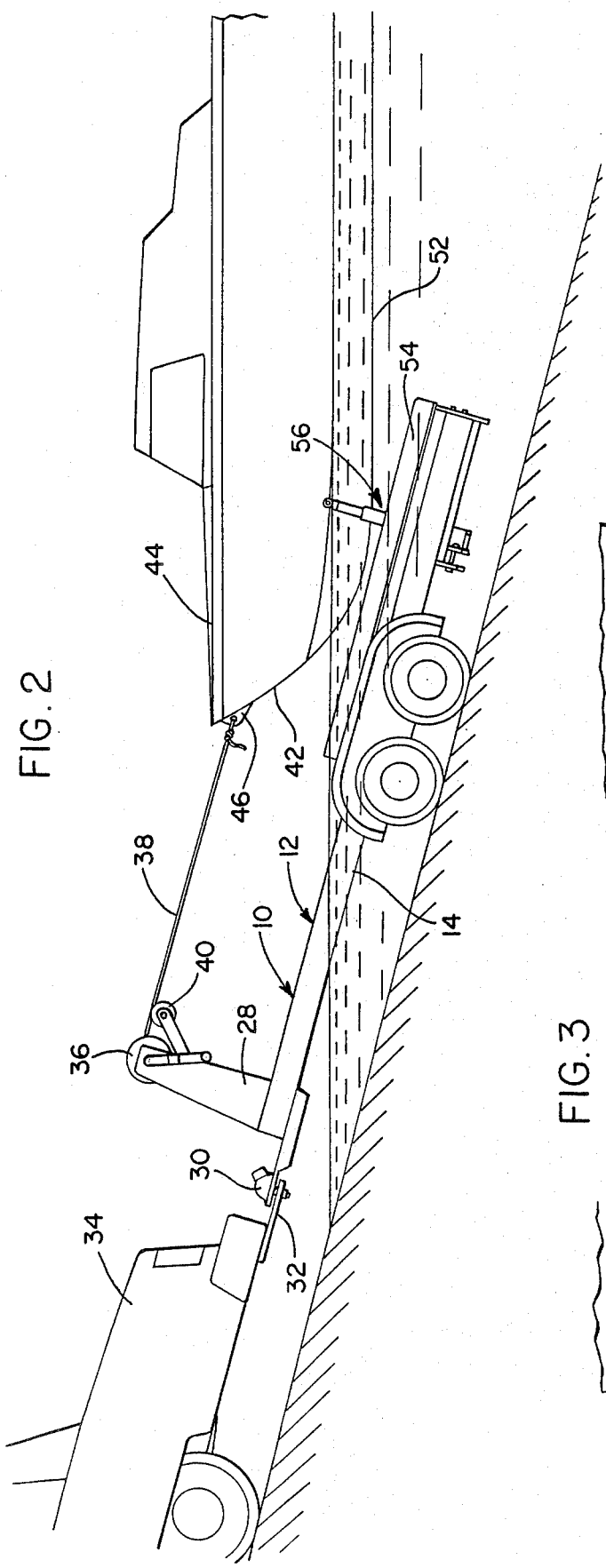
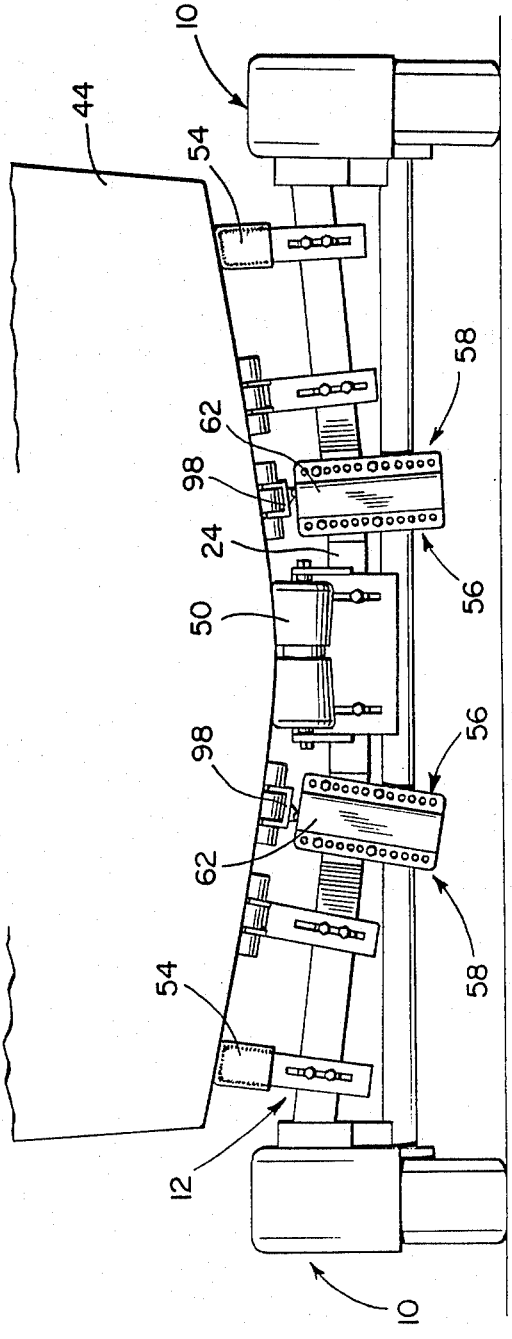

BOAT TRAILER BOAT HULL GUIDING SYSTEM

BACKGROUND OF THE INVENTION

1. Field of the Invention

This invention relates to a pair of opposite side vertically shiftable and upwardly biased roller equipped guide members supported from the rear of a boat trailer hull for initial engagement by the more sharply inclined bow undersurfaces of a hull being advanced into position on the trailer and structured in a manner to continuously guide those bottom surfaces of the hull into correct centered position on the trailer as the hull is forwardly advanced onto the trailer.

2. Description of Related Art

Various different forms of boat hull guiding structures heretofore have been provided for boat trailers. Examples of these previously known forms of boat hull guiding structures are disclosed in U.S. Pat. Nos. 3,130,842, 3,131,902, 3,390,796, 3,603,465, 3,756,439, 3,896,984, 3,917,087, 4,094,527 and 4,209,279.

However, these previously known forms of trailer mounted boat hull guide structures do not include the overall combination of structural features of the instant invention.

SUMMARY OF THE INVENTION

The boat hull guiding structure of the instant invention incorporates a pair of opposite side mount structures mounted from the rear end portion of a boat trailer frame on opposite sides of the longitudinal center line of the frame and a pair of elongated upwardly convergent guide members are mounted from the mount structures for guided longitudinal shifting between upper and lower limit positions relative to the frame and are yieldingly biased toward the upper limit positions. The guide members include upper end portions from which upwardly facing hull undersurface engaging and supporting heads are oscillatably supported for angular displacement relative to the guide members about axes extending generally longitudinally of the trailer frame.

The main object of this invention is to provide boat trailer hull guiding structure on a boat trailer enabling a boat hull to be driven or drawn up onto a boat trailer partially submerged on a loading ramp in a manner such that the boat hull will be properly centered relative to the trailer when fully loaded on the latter.

Another object of this invention is to provide a boat hull guiding system in accordance with the preceding object and which may be readily mounted upon different trailers with substantially no need for adjustment of the boat hull guiding system subsequent to initial mounting of the latter on an associated boat trailer.

A further object of this invention is to provide a boat hull guiding system for boat trailers which is adaptable for use in conjunction with various different types of boat hulls and boat trailers.

Still another object of this invention is to provide a boat hull guiding system for boat trailers constructed in a manner which will prevent the boat hull guiding system from causing damage to boat hulls coming in contact therewith during a boat loading operation.

Still another important object of this invention is to provide a boat hull guiding system in accordance with the preceding objects and incorporating opposite side guide members and mount structures therefor which are identically constructed and thereby enable each mount structure and associated guide member to be utilized on either side of a boat trailer.

A final object of this invention to be specifically enumerated herein is to provide a boat trailer boat hull guiding system in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a rear perspective view of a typical boat trailer upon which the boat trailer boat hull guiding system of the instant invention has been incorporated.

FIG. 2 is a side elevational view of the boat trailer and boat hull guiding system in use preparatory to loading a boat hull onto the boat trailer.

FIG. 3 is a rear elevational view of the boat trailer with a boat hull disposed in loaded position thereon fragmentarily illustrated.

FIG. 4 is an enlarged fragmentary vertical sectional view taken substantially upon the plane indicated by the section line 4—4 of FIG. 1.

FIG. 5 is a vertical sectional view taken substantially upon the plane indicated by the section line 5—5 of FIG. 4.

FIG. 6 is a horizontal sectional view taken substantially upon the plane indicated by the section line 6—6 of FIG. 5.

FIG. 7 is a fragmentary enlarged horizontal sectional view as though taken on section line 7—7 of FIG. 5, but of a modified form of the invention.

DESCRIPTION OF THE PREFERRED EMBODIMENTS

Referring now more specifically to the drawings, the numeral 10 generally designates a conventional form of boat trailer incorporating a longitudinal frame referred to in general by the reference numeral 12 embodying opposite side frame members 14 interconnected by longitudinally spaced transverse frame members 16, 18, 20, 22 and 24 and also including rear partial transverse members 26. A winch stand 28 is carried by the forward end of the frame 12 in addition to a socket hitch element 30 for attachment to the ball hitch assembly 32 of a towing vehicle 34 and the winch stand 28 mounts a winch 36 therefrom having an elongated flexible tensin member 38 partially wound thereon. In addition, the winch stand 28 also supports an abutment roller 40 for engagement with the bow stem area 42 of an associated boat hull 44 immediately beneath the bow eye 46 of the boat hull 44 when the latter is fully loaded on the trailer 10, the free end of the tension member 38 being secured to the bow eye 46.

The longitudinal central area of the frame 12 includes longitudinally spaced rollers 50 journalled therefrom for rollingly supporting the keel area 52 of the boat hull 44 when the latter is loaded on the trailer 10 and the trailer 10 also includes opposite side elongated and longitudinally extending padded bunks 54 for supporting opposite side aft underside portions of the hull 44 when the latter is loaded on the trailer 10, the bunks 54 being transversely and vertically adjustable relative to the frame 12.

The foregoing description applies to conventionally known boat trailers and boat hulls.

The boat hull guiding system of the instant invention incorporates a pair of opposite side assemblies each referred to in general by the reference numeral 56. Each assembly 56 includes a mount structure referred to in general by the reference numeral 58 and an elongated upstanding guide member referred to in general by the reference numeral 60. Each mount structure 58 includes an upstanding tubular member 62 having opposite side mounting flanges 64 supported therefrom, each of the mounting flanges 64 being provided with longitudinally spaced apertures 66. Also, each mount structure includes a pair of elongated strip-type backing plates 68 which also include longitudinally spaced apertures registrable with the apertures 66 and two pairs of bolts 70 which may be secured through selected apertures 66 and corresponding apertures formed in the backing plates 68 in order to mount each mount structure 58 to a corresponding transverse member such as member 24. It is to be noted that the spacing between the bolts 70 secured through each flange 64 may be varied and that the inclination of the tubular members 62 may be varied as desired. Although the tubular members 62 may be vertically disposed, in most instances they will be inclined at least 10° relative to the vertical.

Each guide member 60 includes telescopingly engaged upper and lower inner and outer tubular members 74 and 76. A gas-filled strut 78 extends and is connected between the lower end of each tubular member 62 and the upper end of the corresponding tubular member 76 as at 80 and 82, the tubular member 74 being longitudinally slotted as at 84 and the tubular member 76 being notched as at 86 to provide clearance for the attaching structure at 82 and 80. In addition, a second upstanding gas strut 88 has its lower end anchored relative to the lower end of the tubular member 76 as at 90 and its upper end anchored relative to the upper end of the tubular member 74 as at 92, the upper end of the tubular member 76 being notched as at 94 to provide clearance for the attachment structure as at 92.

The gas strut 88 serves to yieldingly upwardly extend the tubular member 74 relative to the tubular member 76 and the gas strut 78 serves to yielding upwardly extend the tubular member 76 relative to the tubular member 62. Also, it will be noted that both gas struts 78 and 88 are housed completely within the corresponding guide member 60, or the guide member 60 and the tubular member 62.

One side of the upper end of each tubular member 74 is beveled as at 96 and a supporting head 98 is oscillatably supported from the upper end of each tubular member 74 by a through fastener 100 also comprising the attachment of the upper end of the corresponding gas strut 88 to the upper end of the associated tubular member 74 as at 92. Each supporting head 98 includes a base flange 102 from which three rollers 104 are journalled and which is abuttingly engageable with the corresponding beveled end 96, each supporting head 98 being eccentrically weighted relative to the pivot axis defining fastener 100 thereof whereby the supporting head is gravity biased toward the extreme tilted position thereof illustrated in FIG. 5 abutted against the beveled end 96.

With attention now invited more specifically to FIG. 7 of the drawings, a modified form of guide assembly is referred to in general by the reference numeral 56'. The guide assembly 56' is substantially identical to the assembly 56, except that the inner surfaces of the tubular members 62' and 76' thereof include anti-friction coatings 63 and 75. Alternately, the tubular members 74' and 76' may have the coatings 75 and 63 applied to their outer surfaces. Otherwise, the assembly 56' is identical to the assembly 56.

In operation, the assemblies 56 may be mounted on the transverse member 24 in the manner illustrated after the boat hull 44 has been fully loaded on the trailer 10 in the manner illustrated in FIG. 3. Of course, during installation of the assemblies 56 in this manner, the guide members 60 must be retained in substantially fully retracted positions against the biasing action of the gas struts 78 and 88. On the other hand, the assemblies 56 may be mounted upon the transverse member 24 by eye alone if care is taken that the rollers 104 are disposed slightly below oppositely inclined planes containing the upper surfaces of the rollers 50 and the bunks 54 when the guide members 60 are fully downwardly retracted. Furthermore, it is desired that the mounting structures 58 will be mounted in at least slightly upwardly convergent inclined positions. It is pointed out, however, that the precise spacing of the assemblies 56 laterally outwardly of the longitudinal center line of the trailer frame 12 is not critical, since the telescopic action of the guide members 60 will readily compensate for boat hulls of different configurations.

After the assemblies 56 have been mounted in the manner illustrated in FIGS. 1, 2, 4 and 5, a boat may be guided into engagement with the supporting heads 98 from rearwardly thereof and the more sharply inclined opposite side bow undersurface portions of the hull 44 will engage the supporting heads 98 and the bow of the hull 44 will be properly centered relative to the longitudinal center line of the frame 12. Thereafter, with the boat hull 44 directed toward the winch stand 28, the hull 44 may be moved forwardly over the trailer frame 12 and as the hull 44 moves forward relative to the guide members 60, the supporting heads 98 thereon will gradually assume more horizontal positions and the guide members 60 will be downwardly telescoped into the tubular members 62 until such time as the boat hull 44 is in the fully loaded position illustrated in FIG. 3 with the guide members 60 almost fully downwardly retracted relative to the tubular members 62. Of course, the upwardly biasing action of the gas struts 78 and 88 on the tubular members 76 and 74 during forward movement of the hull 44 relative to the trailer frame 12 during a boat loading operation will provide a continuous biasing guiding action on the boat hull 44 in order to maintain the boat hull 44 in proper alignment with the longitudinal center line of the trailer 10.

Because of the plurality of apertures 66 along the flanges 64, the mounting structures 58 may be increassed or decreased in inclination relative to the frame 12. Further, the overall height of the mounting structures 58 also may be readily adjusted.

If for any reason it is desired to mount the mounting structures 58 on the forward side of the transverse member 24, the left and right assemblies 56 are mounted on the right and left sides, respectively, of the trailer frame in order to still enable the supporting heads 98 to assume the gravity biased inclined positions thereof illustrated in FIGS. 1 and 5.

As hereinabove set forth, anti-friction surface coatings 63 and 75 illustrated in FIG. 7 may be interposed between opposing surfaces of the tubular members 62', 76' and 74'.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a boat trailer frame defining front and rear ends, a longitudinal center line extending between said ends and opposite side hull undersurface support structures disposed on opposite sides of said center line and relative to which a boat hull may be advanced and reversed for loading and unloading said hull on and from said trailer frame, a pair of opposite side mount structures mounted from the rear end portion of said frame on opposite sides of said center line, a pair of elongated upwardly convergent guide members having longitudinal axes, said guide members being mounted from said mount structures for independent guided longitudinal shifting along said axes between upper and lower limit positions and yieldingly biased toward said upper limit positions, said guide members including upper end portions from which upwardly facing hull undersurface engaging and supporting heads are oscillatably supported for angular displacement relative to said guide members about first axes extending generally longitudinally of said trailer frame.

2. The boat trailer frame of claim 1 including mounting means supporting said mount structures from said trailer frame for independent lateral and vertical adjustment relative thereto as well as adjusted angular displacement relative to said frame about second axes extending longitudinally of said frame.

3. The boat trailer frame of claim 1 wherein said supporting heads include rollers supported therefrom for rotation about axes disposed transverse to said first axes.

4. The boat trailer frame of claim 1 wherein said mount structures each defines an upwardly opening tubular passage, said guide members being telescopingly received in said passages for longitudinal shifting relative thereto.

5. The boat trailer frame of claim 4 wherein said guide members each includes upper and lower relatively telescopingly engaged and longitudinally shiftable tubular members and said lower tubular members are telescopingly received in said passages, said upper and lower tubular members being extendable and retractable relative to said lower tubular member and tubular passage, respectively.

6. The boat trailer frame of claim 5 including elongated extendable and retractable gas strut means connected between said guide member and said lower tubular member and between said lower tubular member and said upper tubular member by which said guide members are yieldingly biased toward the upper limit positions thereof.

7. The boat trailer frame of claim 6 wherein said supporting heads include rollers supported therefrom for rotation about axes disposed transverse to said first axes.

8. The boat trailer frame of claim 3 wherein said mount structures each defines an upwardly opening tubular passage, said guide members being telescopingly received in said passages for longitudinal shifting relative thereto.

9. The boat trailer frame of claim 8 including mounting means supporting said mount structures from said trailer frame for independent lateral and vertical adjustment relative thereto as well as adjusted angular displacement relative to said frame about said axes extending longitudinally of said frame.

10. The boat trailer frame of claim 1 wherein said heads and the upper end portions of said guide members include coacting abutment means limiting angular displacement of said heads relative to said guide members between first limit positions with said heads in upright upwardly facing positions and second inclined limit positions with said heads facing upwardly in convergent directions inclined generally 45° relative to the horizontal.

* * * * *